United States Patent [19]

Jones et al.

[11] Patent Number: 4,743,488

[45] Date of Patent: May 10, 1988

[54] LAMINATED ARTICLE AND METHOD OF FORMING THE SAME

[75] Inventors: Wallace R. Jones, Waite Hill Village; Robert A. Isaksen, Chardon; Paul A. Krieger, North Ridgeville, all of Ohio

[73] Assignee: Excello Specialty Company, Cleveland, Ohio

[21] Appl. No.: 925,224

[22] Filed: Oct. 31, 1986

[51] Int. Cl.$^4$ .......................... B32B 3/26; B32B 7/14; B32B 31/00
[52] U.S. Cl. ..................................... 428/198; 156/235; 156/249; 156/291; 428/246; 428/317.1
[58] Field of Search ...................... 156/235, 249, 291; 428/198, 317.1, 317.3, 317.5, 317.7, 197, 304.4, 316.6, 246

[56] References Cited

U.S. PATENT DOCUMENTS

| | | | |
|---|---|---|---|
| Re. 26,473 | 10/1968 | Reynolds et al. | 428/246 |
| 3,251,727 | 5/1966 | Reynolds et al. | 428/246 |
| 3,483,664 | 12/1969 | Funk et al. | 428/317.1 |
| 3,666,595 | 5/1972 | Bauer | 428/317.1 |
| 4,488,619 | 12/1983 | O'Neill | 428/317.1 |

*Primary Examiner*—William J. Van Balen
*Attorney, Agent, or Firm*—Fay, Sharpe, Beall, Fagan, Minnich & McKee

[57] ABSTRACT

A laminated article particularly useful for forming shoe upper and a method of forming the same. The method generally comprises applying a thin and relatively uniform thickness layer of pressure sensitive adhesive to a release coated surface of a first thin and flexible sheet of material. The adhesive is applied in a regular discontinuous pattern having a multiplicity of small areas separated by pressure sensitive adhesive coated areas. The adhesive is allowed to cure or dry on the first sheet and, thereafter, the adhesive coated face of the first sheet is aligned with a second sheet of foam material and brought into contact therewith under sufficient pressure to bond the adhesive to the foam sheet. The release coated first sheet is left in place on the cured adhesive until it is desired to bond the sheet of foam material to a third sheet of flexible material, such as a sheet of shoe upper material. With the first sheet removed, the sheet of foam material can be aligned with the third sheet and bonded thereto through the application of pressure either manually or with squeeze rolls. Because the adhesive is applied in a discontinuous pattern with a multiplicity of small open areas and then dried or cured on the release sheet, it is neither absorbed into the foam sheet nor does it affect the flexibility or breathability of the foam sheet. The foam sheet thus retains the proper feel, and when joined to the third sheet, results in a composite or laminate structure having the desired characteristics.

9 Claims, 2 Drawing Sheets

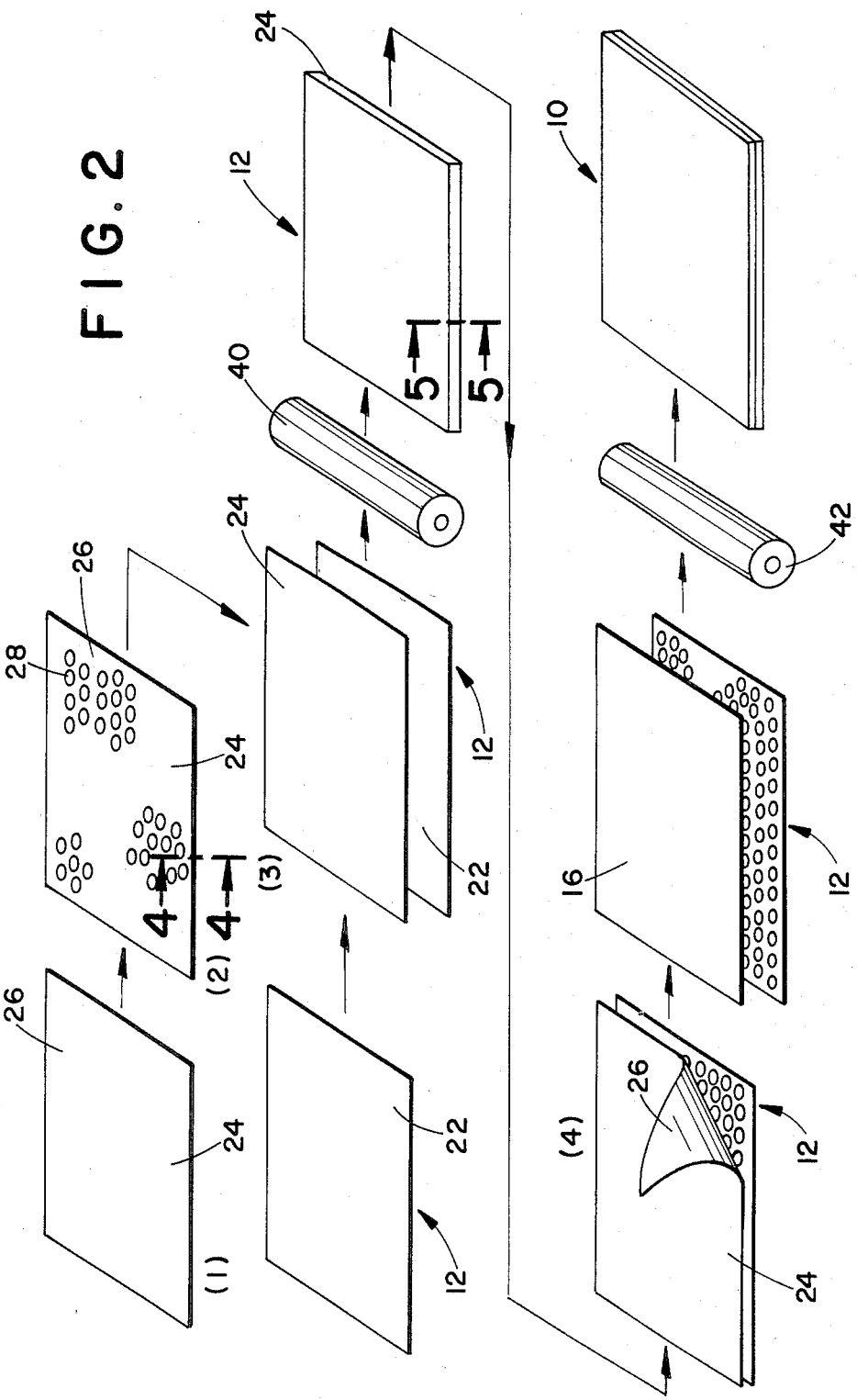

LAMINATED ARTICLE AND METHOD OF FORMING THE SAME

BACKGROUND OF THE INVENTION

The subject invention is directed toward the art of adhesive bonding and, more particularly, to an adhesively bonded flexible, laminated article and a method of making the same.

The invention is especially suited for manufacturing laminated sheet materials used in making shoe uppers and will be described with particular reference thereto; however, the invention is capable of broader application and could be used for making a variety of similar, flexible laminated products useful in many different environments.

Modern shoe fashions prescribe relatively frequent and sudden changes in the outer materials used in the manufacture of shoe upppers. The manufacturing methods and the materials used for shoe liners have, however, remained relatively constant.

A typical shoe liner material comprises a woven fabric, such a nylon tricot bonded to a thin layer of urethane foam or some other type of foam product. A layer of flannel or a non-woven stock is normally bonded to the other side of the foam.

In the process of making a shoe, the flannel face of the liner laminate is bonded to the shoe upper material in large sheets. The nylon tricot surface becomes the inner surface of the shoe when the laminated liner-upper material is cut into the necessary shapes and sewn into a shoe upper.

The prior methods used for bonding the liner laminate to the upper material have been an ongoing problem and have made it difficult to quickly change over to different shoe outer materials.

Typically, two different bonding methods have been used. The first relatively common method has been to use a liquid adhesive which is coated on the inner surface of the shoe outer material. The shoe liner material is then bonded to the adhesive coated surface using manual or machine lamination methods. As can be appreciated, this method is both messy and time consuming.

The second method often employed is to use a shoe liner material which has been precoated with a pressure sensitive adhesive which is overlayed with a removable protective sheet or liner. Bonding between the liner and upper material takes place substantially instantly when the protective sheet is removed and the liner is applied to the upper material. This method has resulted in increased manufacturing efficiency but has two distinct drawbacks. First, the method causes the softness or "hand" of the liner to be adversely affected. Secondly, the continuous layer of pressure sensitive adhesive acts as a vapor barrier and makes the shoe liner non-breathable. As a result of these drawbacks, the use of this second method has been severely limited.

As can be appreciated from the foregoing, there is a distinct need for an improved method for bonding shoe liner materials to shoe upper materials.

SUMMARY OF THE INVENTION

The subject invention provides a method of bonding which overcomes the problems noted above and produces a resulting laminated product which has the desired characteristics.

More particularly, and in accordance with a preferred embodiment of the invention, the method generally comprises applying a thin and relatively uniform thickness layer of pressure sensitive adhesive to a release coated surface of a first thin, and flexible sheet of material. The adhesive is applied in a regular discontinuous pattern having a multiplicity of small open areas separated by pressure sensitive adhesive coated areas. The adhesive is allowed to cure or dry on the first sheet and, thereafter, the adhesive coated face of the first sheet is aligned with a second sheet of foam liner material and brought into contact therewith under sufficient pressure to bond the adhesive to the foam sheet.

The release coated first sheet is left in place on the adhesive until it is desired to bond the sheet of foam material to a third sheet of flexible material, such as a sheet of shoe upper material. With the first sheet removed, the sheet of foam material can be aligned with the third sheet and bonded thereto through the application of pressure either manually or with squeeze rolls.

Because the adhesive is applied in a discontinuous pattern with a multiplicity of small open areas and then dried or cured on the release sheet, it is neither absorbed into the foam sheet nor does it affect the flexibility or breathability of the foam sheet. The foam sheet thus retains the proper feel, and when joined to the third sheet, results in a composite or laminate structure having the desired characteristics.

In addition to the above, the use of the described method is much simpler and less messy than prior methods. It also allows rapid production changeover.

Accordingly, a primary object of the present invention is the provision of an improved method of using pressure sensitive adhesives to form laminates of porous absorbent materials.

A further object of the invention is the provision of a method of joining sheets of shoe liner material to shoe upper material in a manner which does not adversely affect the properties of the resultant composite structure.

Yet another object is the provision of a method of the type desribed which is simple and economical to use.

A still further object of the invention is the provision of a laminated article formed from porous and absorbant materials in a manner such that it retains its breathability and flexibility.

A further object is to provide a means of joining two surfaces where a continuous layer of laminating adhesive is not desired because of consideration of permeability, physical properties, or cost.

Still other objects and advantages of the invention will become apparent to those skilled in the art upon a reading and understanding of the followinjg detailed description.

BRIEF DESCRIPTION OF THE DRAWINGS

The invention may take form in certain parts or steps, and arrangements thereof, preferred embodiments of which will be described in detail in this specification and illustrated in the accompanying drawings which form a part hereof and wherein:

FIG. 2 is a diagrammatic showing of the preferred method steps used for forming the product of FIG. 1;

DETAILED DESCRIPTION OF THE PREFERRED EMBODIMENTS

Figure 1:
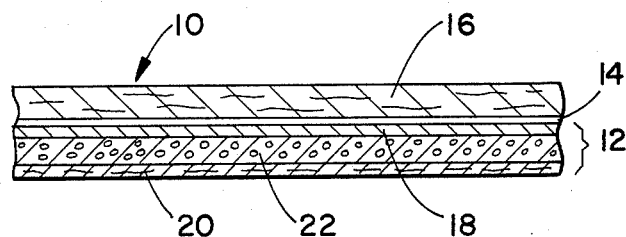
FIG. 1 is a cross-sectional view through a laminated sheet material product formed in accordance with the subject invention and useful for forming shoe uppers.

Referring now to the drawings wherein the showings are for the purpose of illustrating preferred embodiments of the invention only and not for the purpose of limiting same, FIG. 1 is a cross-sectional view through a flexible composite laminate structure 10 especially useful for forming shoe uppers. Again, and while the preferred embodiment of the invention will be described with reference to shoe uppers, it is to be appreciated that the invention is equally applicable to a variety of other environments.

Broadly, as shown, the FIG. 1 structure 10 comprises a flexible, relatively soft and porous layer 12 of a typical laminate sheet material often used for liners in shoe uppers. The sheet 12 is bonded at 14 to a sheet or layer of shoe outer material 16. Many different types of liner materials could be used within the scope of the subject invention; however, a relatively standard liner material shown herein and used in the manufacture of shoe uppers comprises an intermediate thin layer or sheet 18 formed from a urethane foam or the like. A suitable woven fabric, such as nylon tricot, 20 is joined to one face of the foam core member 18. The opposite face or the foam core 18 is covered by a flannel fabric 22 or, in some cases, a suitable non-woven, felt-like fabric.

The liner assembly 12 is soft, flexible and porous so as to have "breathability". The liner assembly 12 is, as mentioned, bonded to the innerface of a suitable layer or sheet 16 of shoe upper material. As can be appreciated, the shoe upper layer 16 can be leather or a heavy fabric such as canvas or the like suitable for shoe construction. The sheet assembly 10 is formed as shown and thereafter die cut to form the shoe upper compoenets which are subsequently sewn together.

As already discussed, the bonding of the liner layer 12 to the shoe outer layer 16 has been an ongoing problem. Prior methods have resulted in destroying the breathability of the overall composite product or adversely affecting its flexibility and feel. According to the subject invention, the problems are overcome by an adhesive bonding process diagrammatically illustrated in FIG. 2. As shown therein, the process generally begins by providing a sheet of paper or suitable flexible film material 24 having a suitable release coating 26 applied to at least one face thereof. As is well known, the release coating must be selected to be compatible with the pressure sensitive adhesive used. In particular, the pressure sensitive adhesive must have less adhesivity for the coated surface than for the material to which it is subsequently to be transferred. Many conventional silicione based release coatings are known in the art and could be used in the practice of the subject invention.

The next step of the process comprises applying a pressure sensitive adhesive layer 28 to the release coated face 26 of the release sheet 24. Preferably, the adhesive layer 28 is applied using conventional printing techniques known in the art. It is applied in a layer of relatively uniform thickness to extend throughout the area defined by sheet 24. According to the invention, the adhesive is applied in a predetermined discontinuous pattern comprising a multiplicity of closely spaced open areas among individual, separate or connected adhesive areas.

Figures 3A, 3B, 3C:
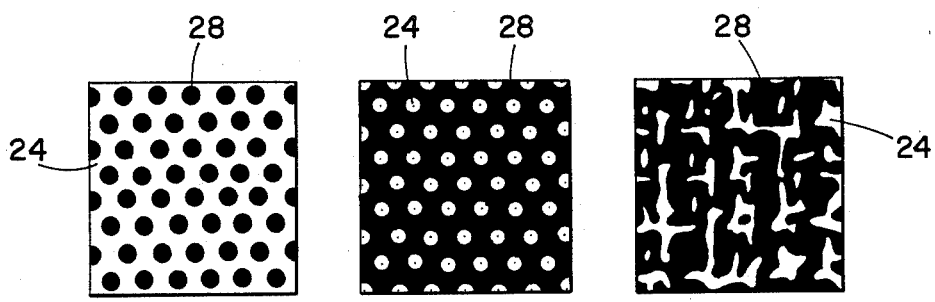
FIGS. 3a through 3c are plan views of alternative patterns which can be used for applying the pressure sensitive adhesive used in performing the method of the invention.
Figure 4:
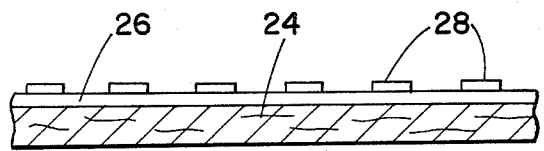
FIG. 4 is a cross-sectional view taken on line 4—4 of FIG. 2.

Many different patterns of application of the pressure sensitive adhesive could be used within the scope of the invention. FIGS. 3a through 3b show such possible adhesive application patterns. For example, according to FIG. 3, the adhesive is applied in a plurality of discrete dots which are closely spaced completely across the sheet 24. Preferably, at least more than 30% of the total area is open and does not have the adhesive applied thereto. FIG. 3b shows an alternative form of adhesive application. In this form, the adhesive is applied in effectively the reverse of that shown in FIG. 3a. That is, the open areas are in the form of small circles or dots in an otherwise continuous coating of pressure sensitive adhesive. FIG. 3c shows a third alternative in which the adhesive is applied in a somewhat random pattern of irregularly shaped open areas surrounded by areas coated with pressure sensitive adhesive.

Irrespective of the particular exact manner of the application of adhesive layer 28 to the sheet 24, the adhesive is cured or dried, as the case may be, while the adhesive is in place on sheet 24 and prior to further use of the sheet.

After the adhesive has dried or cured, a sheet of liner material 12 having approximately the same size and shape as the carrier sheet 24 is brought into alignment with sheet 12 as shown in step 3. Specifically, the adhesive coated surface 26 of sheet 24 is place in opposed relationship to the flannel covered surface 22 of liner sheet 12. Thereafter, the two opposed surfaces are brought into contact and sufficient pressure applied to cause the pressure sensitive adhesive to bond to surface layer 22 of the liner sheet 12. The pressure can be applied manually or through the use of suitable squeeze roller 40.

Figure 5:
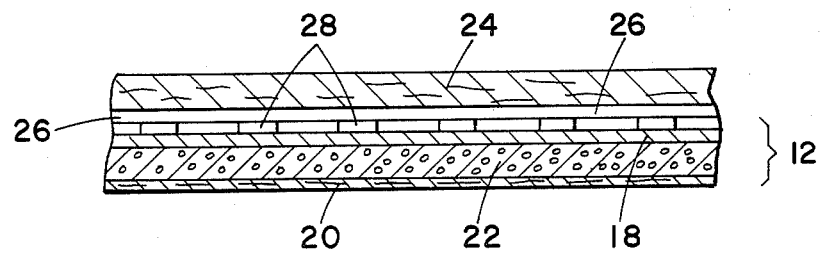
FIG. 5 is a cross-sectional view taken on line 5—5 of FIG. 2.

After sheets 12 and 24 have been suitably pressed together, the resulting article has the construction as best shown in FIG. 5. That is, the individual areas or spots of pressure sensitive adhesive lay 28 are firmly bonded to the surface 22 of sheet 12. As shown in FIG. 5, the release sheet 24 is also in position on the pressure sensitive adhesive to protect it from contamination until subsequent use. The liner sheets 12 kwith the release sheets 24 in place thereon can be stored for subsequent use or immediately used in carrying out the remaining sequence of the method.

When it is desired to bond the liner sheet 12 to a layer of shoe uppper material, the release sheet 24 is stripped from the liner sheet 12 as shown in step 4 of FIG. 2. Thereafter, a sheet 16 of shoe upper material is brought into alignment with the pressure sensitive coated surface of the liner sheet 12 and the opposed surfaces thus aligned are brought together and sufficient pressure applied to bond the liner sheet 12 to the sheet of outer material 16. Here, again, the pressure can be applied manually or through use of a suitable squeeze roller 42.

The resulting article has the liner sheet 12 firmly bonded to the sheet of outer material 16. Bonding is, however, limited to the discrete areas of adhesive application as discussed with reference to step 2. That is, significant open area remains between the points or areas of adhesive application. The composite structure thus retains its breathability. In addition, since the adhesive is first applied to the carrier sheet and cured before application to the foam liner, the liner does not absorb the adhesive to any significant extent. Thus, the resulting composite retains its softness and proper "feel."

Moreover, the process eliminates the messy adhesive application steps of the prior methods and allows the liner sheets to be quickly applied to a variety of upper sheets, without requiring major change-over of processing lines, etc.

Although the invention has been shown and described with respect to certain preferred embodiments, modifications and alterations will occur to others skilled in the art upon a reading and understanding of this specification. It is intended to include all such modifications and alterations insofar as they come within the scope of the claims or the equivalents thereof.

Having thus described the invention, it is now claimed:

1. A method of forming a flexible, laminated sheet product comprising the steps of:
   a. providing a thin, flexible first sheet of material having a release coating on a face thereof;
   b. coating a relatively thin and uniform thickness of pressure sensitive adhesive on the release coated face of said first sheet in a regular, discontinuous pattern having a multiplicity of open areas separated by pressure sensitive adhesive coated areas;
   c. curing the pressure sensitive adhesive on said first sheet of material;
   d. providing a second sheet comprising a flexible foam material having first and second faces;
   e. aligning the first sheet with the second sheet and bringing the pressure sensitive adhesive coated face of said first sheet in contact with said first face of said second sheet;
   f. applying sufficient pressure to said first sheet to cause said pressure sensitive adhesive to bond to the first face of said second sheet and thereafter stripping said first sheet from said second sheet to leave the pressure sensitive adhesive bonded to the first face of said second sheet in said regular, discontinuous pattern;
   g. providing a third sheet of flexible material having first and second faces;
   h. aligning the pressure sensitive adhesive coated face of said second sheet with the first face of said third sheet; and,
   i. bringing the adhesive coated face of said second sheet into contact with the first face of said third sheet and thereafter applying sufficient pressure to bond said second sheet to said third sheet.

2. The method as defined in claim 1 wherein said second sheet is comprised of plural bonded layers and wherein said first face of said second is fabric.

3. The method as defined in claim 1 wherein the step of applying pressure to bond said second sheet is performed with a squeeze roll.

4. The method as defined in claim 1 wherein said first sheet is paper and said pattern of pressure sensitive adhesive applied thereto is applied in a uniform pattern of discrete dots.

5. The method as defined in claim 1 wherein said second and third sheets are each formed from a relatively porous material and wherein at least one of said second and third sheets includes a layer of fabric.

6. The method of claim 1 wherein said second sheet is a sheet of shoe liner material comprising a layer of foam material with a layer of fabric bonded thereto to define said first face.

7. The method of claim 6 wherein said third sheet is a sheet of shoe outer material and wherein said pressure sensitive adhesive is applied in a pattern which has the open areas uniformly distributed over the entire surface of said first sheet.

8. The method of claim 7 wherein the first face of said second sheet is a fabric and said pressure sensitive adhesive coated fact of said first sheet is brought into contact with said adhesive.

9. A laminated article comprising:
   a first flexible thin sheet of foam material having first and second faces with fabric joined to extend across at least said first face;
   a second sheet of flexible material joined the extend across said second face of said first sheet by a pressure sensitive adhesive applied to said second face of said first sheet in a manner to prevent significant absorption of said adhesive by said first sheet, said pressure sensitive adhesive applied in a regular, discontinuous pattern having a multiplicity of open areas separated by pressure sensitive adhesive whereby the breathability and flexibility of said laminated article is not adversely affected by said pressure sensitive adhesive.

* * * * *